United States Patent [19]

Pratt et al.

[11] Patent Number: 4,996,025
[45] Date of Patent: Feb. 26, 1991

[54] ENGINE BEARING ALLOY COMPOSITION AND METHOD OF MAKING SAME

[75] Inventors: George C. Pratt, Ann Arbor; Warren J. Whitney, Jr., Ypsilanti, both of Mich.

[73] Assignee: Federal-Mogul Corporation, Southfield, Mich.

[21] Appl. No.: 821,716

[22] Filed: Jan. 23, 1986

[51] Int. Cl.$^5$ .............................................. C22C 21/00
[52] U.S. Cl. ..................... 420/554; 164/122; 384/276; 29/898.12; 29/898.14
[58] Field of Search ............. 164/122, 128, 463, 459; 420/554; 384/276; 29/898.12, 898.14

[56] References Cited

U.S. PATENT DOCUMENTS

| | | | |
|---|---|---|---|
| 3,078,563 | 2/1963 | Gould et al. | 228/235 |
| 3,410,331 | 11/1968 | Miller et al. | 420/554 |
| 3,432,293 | 3/1969 | Michael et al. | 420/554 |
| 3,495,649 | 2/1970 | Waters et al. | 420/554 |
| 3,522,836 | 8/1970 | King | 164/463 |
| 3,545,943 | 12/1970 | Miller et al. | 420/554 |
| 3,562,884 | 2/1971 | Webbere | 420/554 |
| 3,580,328 | 5/1971 | Eppich et al. | 164/463 |
| 3,605,863 | 9/1971 | King | 164/463 |
| 3,667,823 | 6/1972 | Webbere | 420/554 |
| 4,069,369 | 1/1978 | Fedor et al. | 420/554 |
| 4,333,775 | 6/1982 | Mahrus | 420/554 |
| 4,479,528 | 10/1984 | Maringer | 164/463 |
| 4,484,614 | 11/1984 | Maringer | 164/463 |

FOREIGN PATENT DOCUMENTS

| | | | |
|---|---|---|---|
| 2263268 | 7/1974 | Fed. Rep. of Germany | 420/554 |
| 107056 | 6/1984 | Japan | 420/554 |
| 349746 | 9/1972 | U.S.S.R. | 420/554 |

Primary Examiner—Sam Heinrich
Attorney, Agent, or Firm—Lawrence J. Shurupoff; Robert F. Hess

[57] ABSTRACT

An engine bearing having an aluminum-lead bearing alloy and a method of casting such aluminum-lead alloys in which the bimetal lining after bonding of the alloy has no lead gradient and contains no lead ribbons of significant size.

3 Claims, 2 Drawing Sheets

ENGINE BEARING ALLOY COMPOSITION AND METHOD OF MAKING SAME

BACKGROUND OF THE INVENTION

This invention relates to an engine bearing alloy composition of aluminum and lead and a method of making such an alloy in strip form by a high quench rate process. The majority of engine bearing alloys have a metallurgical structure consisting of a soft low-melting-point phase uniformly distributed throughout a relatively hard and strong matrix. The soft phase consists of innumerable small islands of the order of 0.001–0.1 mm in size, which may or may not be interconnected. When the matrix is copper or copper strengthened by minor additions of alloying elements, the soft phase is commonly lead. When the matrix is aluminum or aluminum strengthened by minor additions of alloying elements, the soft phase is commonly tin. The volume percentage of soft phase is 10–40% in the copper-lead system, 2–20% in the aluminum-tin system. At the lower end of each range it is common practice to augment the bearing properties of the alloy by providing the bearing with a soft thin overlay of a lead-based alloy.

Aluminum-lead is a desirable engine bearing alloy with good bearing properties. Moreover, lead is a less expensive metal than tin. The extent to which aluminum-lead has been adopted as an engine bearing alloy in practice has, however, been limited by the metallurgical problems associated with production of the alloy. In order to obtain a fine distribution of lead throughout an aluminum matrix it is first necessary to dissolve the lead in molten aluminum. The melt temperatures necessary to do this are much higher than are commonly used in aluminum casting practice. The higher the proportion of lead it is desired to incorporate, the higher must be the melt temperature. A greater difficulty arises during cooling prior to solidification of the alloy. As the melt cools, lead is precipitated in the form of discrete droplets of molten lead. The specific gravity of these droplets is very much higher than that of the surrounding molten aluminum. Even though the molten aluminum still contains some lead in solution, its specific gravity is less than one quarter that of the molten lead droplets. The droplets, therefore, fall through the molten aluminum under the influence of gravity. When the aluminum freezes, a preponderance of lead is found at the bottom, while the top is denuded of lead. The desirable uniform distribution of lead has thus not been achieved.

Various methods of producing aluminum-lead bearing alloys have been proposed, some of which have been put into practice with varying degrees of success. These methods are briefly explained below.

One method (as shown in U.S. Pat. Nos. 3,410,331; 3,545,943; 3,562,884; 3,580,328 and 3,667,823) consists of dissolving lead in molten aluminum and horizontally continuously casting the alloy. The cast alloy is then rolled and roll-bonded to steel, and steel-backed bearings are formed from the resulting bimetal. Owing to the lead segregation phenomenon described above the under side of the cast is lead rich, the top side is denuded of lead and there is a lead gradient through the thickness of the cast. The low-lead side of the rolled alloy is used for bonding to the steel backing, the high lead side being removed during machining of the bearing to its final dimensions. The amount of lead appearing in the machined bearing surface depends on the nature of the lead gradient in the as-cast alloy and on the thickness of the finished bearing lining relative to the as-bonded lining thickness.

Achievement of a desirable known and constant lead content in the bearing surface requires very close control of the casting conditions, such that the lead gradient has a constant value, and close control of the bonding conditions, such that the thickness reduction of the steel backing during bonding is known precisely. Such close control is in fact difficult to achieve in practice, and represents a significant drawback to the process. A further drawback is that the problem of controlling the lead gradient becomes more difficult as the percentage lead incorporated in the melt is increased. Although U.S. Pat. No. 3,410,331 speaks of a process in which the lead content of the melt is up to 15% by weight (4.0% by volume), in practice the process has not been operated in production with lead contents above 6% by weight (1.5% by volume) because of the aforementioned difficulty. 1.5% by volume is less than the amount required for the optimum combination of bearing properties. Yet a further drawback to the process is that the lead particles in the as-cast alloy may be larger than is desirable. A typical size range is 20–200 microns. During the rolling and roll-bonding processes the alloy is reduced in thickness by a factor of about twenty, and elongated by the same factor. The spherical lead particles become elongated into ribbons 400–4000 microns in length. Lead in this form is considered undesirable for certain applications since it leads to a lowering of the fatigue strength of the bearing lining.

A second method is shown in U.S. Pat. No. 3,495,649 and consists of dissolving lead in molten aluminum and vertically continuously casting the alloy. Segregation of lead droplets occurs in this process also, the first alloy cast being lead-rich, and the last alloy cast being denuded of lead. In theory, equilibrium is achieved for the major part of the cast and, except for the beginning and the end, the alloy contains a uniform lead content. In practice, any change in the cooling conditions in the casting die results in a change in the rate of segregation and a variation in the lead content. For this and other metallurgical reasons, the process has not been put into production.

Another method (shown in U.S. Pat. No. 3,432,293) consists of dissolving lead in molten aluminum and solidifying while the melt is falling freely, like a waterfall, under the influence of gravity. Under such conditions there is no tendency for the lead to segregate and a uniform distribution of lead is in theory obtained. In practice, the problems of uniformly freezing a free-falling stream of molten aluminum-lead are formidable, and the invention has not been realized in practice. Other proposals, such as solidifying the melt in space, away from the influence of the earth's gravitational field, have proved even more impracticable.

Yet another method (shown in U.S. Pat. No. 4,069,369) consists of dissolving lead in molten aluminum and atomizing a stream of the molten metal to powder. Each atomized particle freezes very quickly and the precipitated lead is distributed uniformly within each particle. The powder is then consolidated by rolling into a strip, which is sintered and roll-bonded to steel. The process produces an aluminum-lead bimetal lining without a lead gradient, but which still contains undesirable lead ribbons up to 500 microns in length. The process is, moreover, unattractive in that there are several process stages, making the overall process costs relatively high.

A final method consists of mixing aluminum and lead powders, together with other minor additions, in powder form, spreading the powder onto steel, roll compacting and sintering. The resultant bimetal strip lining has no lead gradient and contains no lead ribbons of significant length. The process economics are good. However, the fatigue strength of the alloy produced in this way is likely to be adversely affected because of the oxide coating on the individual aluminum-lead powder particles. Such bearings are considered suitable only for lightly loaded applications.

SUMMARY OF THE INVENTION

The invention disclosed in the present patent application relates to an engine bearing having a particular aluminum-lead bearing alloy and a method of casting such aluminum-lead alloys which suffers from none of the drawbacks associated with the above described prior art methods. The process economics are good and the bimetal lining after bonding of the alloy has no lead gradient and contains no lead ribbons of significant size. The casting process produces a novel aluminum-lead microstructure with much smaller lead particles than are obtained by any other process.

DETAILED DESCRIPTION OF THE PREFERRED EMBODIMENT

Figure 1:
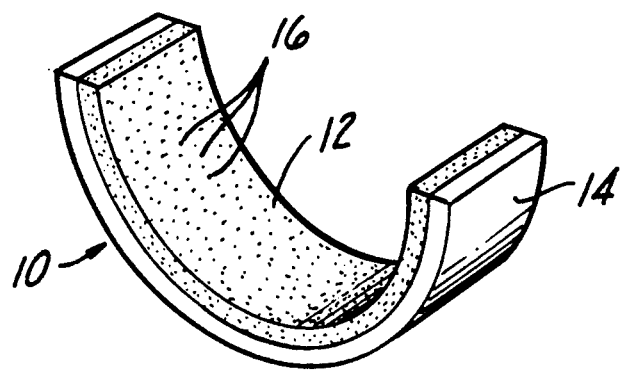
FIG. 1 is a perspective view of an engine bearing in accordance with the subject invention.

In FIG. 1 is shown a conventional bimetal engine bearing. Such a bearing in its most simple form comprises a semicylindrical bearing sheel (10) comprising a steel back (14) and a cast strip of bearing alloy (12) roll-bonded to the steel back. Exposed lead particles in the subject aluminum-lead bearing alloy (12) are schematically shown at (16). The process of roll-bonding the cast alloy to the steel backing is shown and described in U.S. Pat. No. 3,078,563, assigned to the assignee of the subject invention, the teachings thereof being incorporated herein by reference.

The alloy is essentially comprised of aluminum and lead, with the lead being present up to an amount no more than 15% by weight, and preferably ranging from about 4% to about 10%. Also added to the alloy may be a number of other constituents not to exceed a total of about 10% by weight of the alloy, such constituents to include, for example, tin, silicon and strengthening additions such as copper, manganese and magnesium.

The process of casting the bearing alloy itself consists of casting a thin ribbon of aluminum-lead alloy between 1 and 5 mm in thickness and preferably between 1 and 3 mm in thickness, the rate of heat removal being such that the alloy temperature falls from a melt temperature in excess of 900° C. to a freezing temperature (liquidus) below 650° C. in less than 0.1 seconds, and preferably less than 0.05 seconds.

Figure 2:
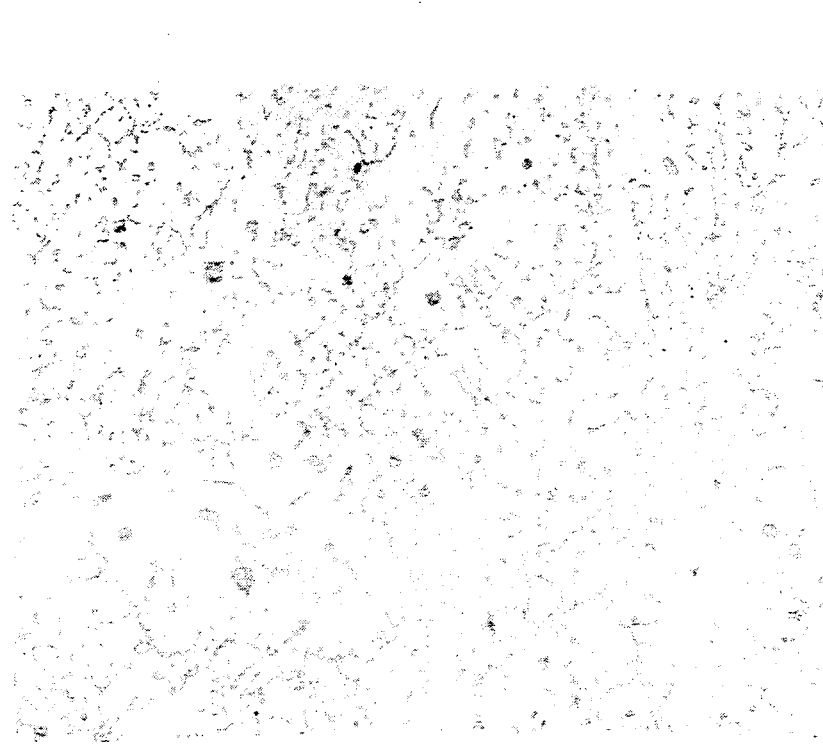
FIGS. 2 and 3 are photomicrographs of an engine bearing alloy in accordance with the subject invention.
Figure 3:
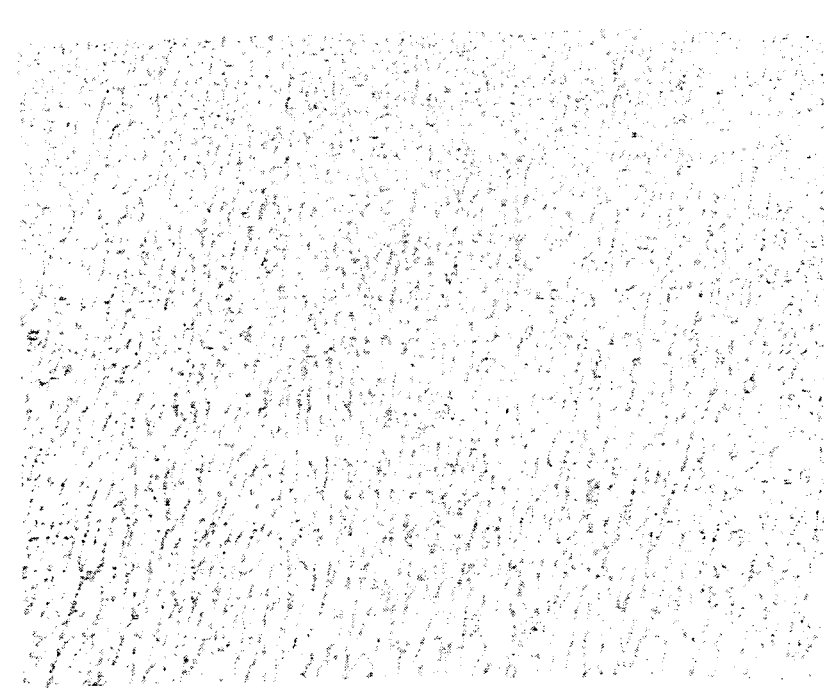

The microstructure obtained when the alloy is cast with such a high rate of cooling is illustrated in FIGS. 2 and 3. The maximum lead particle size is 5 microns.

The terminal velocity of a sphere falling under gravity through a liquid is given by the formula $$v = \frac{2}{9} \frac{r^2}{e} g(d_s - d_l)$$

where r is the radius of the sphere, e is the viscosity of the liquid, g is the acceleration due to gravity, $d_s$ is the density of the sphere and $d_l$ the density of the liquid.

The segregation velocity of a lead particle 5 microns in diameter will thus be one four-hundredth that of a particle 100 microns in diameter. This, combined with the very short time, of the order of one-tenth of a second, in which segregation can occur ensures that the amount of lead segregation which occurs is immeasurably small.

Table 1 illustrates the difference in lead content and lead size between the top and bottom halves of horizontally continuously cast aluminum lead alloy, one cast 1.25 mm thick and cooled from 900° C. to 650° C. in less than 0.1 seconds, the other cast 10.5 mm thick and cooled from 900° C. to 650° C. in 5 to 10 seconds.

| Cast Thickness (mm) | Lead Content % by weight | | Lead Particle Size microns | |
| --- | --- | --- | --- | --- |
| | Top Half | Bottom Half | Top Half | Bottom Half |
| 1.25 | 5.9 | 5.6 | 2–10 | less than 2 |
| 10.50 | 2.6 | 7.0 | 5–25 | 25–100 |

The thin rapidly cooled aluminum-lead alloy showed no lead segregation towards the bottom of the cast (analysis in fact showed a slightly higher lead content in the top half of the cast, but the difference is within the experimental error of the technique). Comparing the top half of the two casts, the thin rapidly cooled alloy showed a lead size smaller by a factor of four to five than the thicker slowly cooled alloy. Comparing the bottom half of the two casts, the lead size in the thin rapidly cooled alloy was finer by a factor of at least thirty.

Details of the two casting runs are as follows:

| | Casting Thickness (mm) | |
| --- | --- | --- |
| | 1.25 | 10.5 |
| Casting Direction | Horizontal | Horizontal |
| Casting Surface | Rotating water-cooled wheel with copper sleeve. | Stationary graphite die with water cooled copper jacket. |
| Melt Temperature °C. | 970 | 970 |
| Casting Speed m/min. | 50 | 0.5 |

Figure 4:
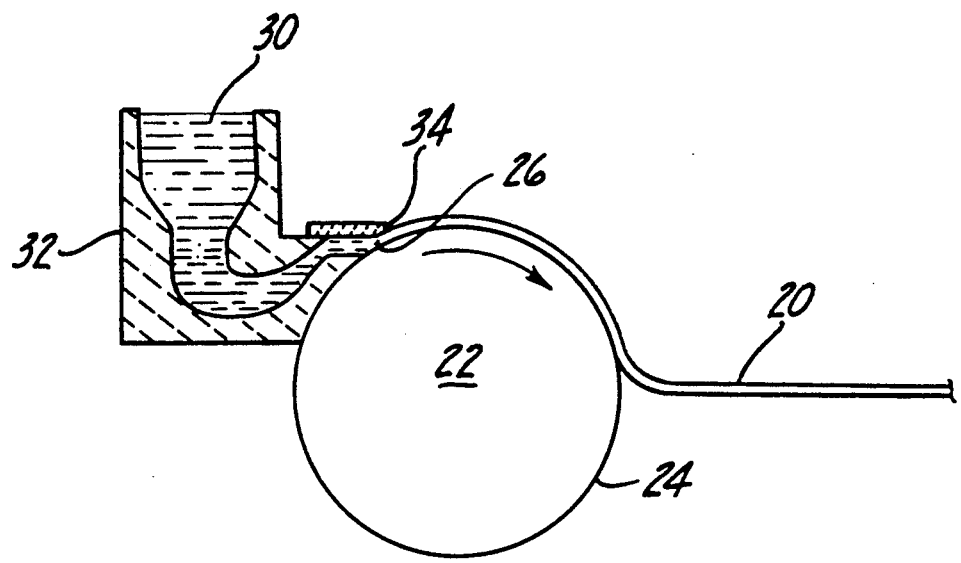
FIG. 4 is a schematic view of the apparatus required to make the engine bearing alloy of the subject invention.

In the rotating water-cooled wheel runs, the molten alloy was applied to the peripheral surface of the wheel in accordance with the apparatus and general method shown and described in U.S. Pat. No. 4,484,614. Specifically, FIG. 4 generally illustrates an apparatus for casting metallic strip material (20) in accordance with the present invention. This apparatus includes an element (22) upon which the strip (20) is cast. In a preferred embodiment a continuous strip (20) is cast onto the outer peripheral surface (24) of a circular drum or wheel as shown in FIG. 4. It should be understood that configurations other than circular may be employed. Also, a belt capable of rotating through a generally oval path may be employed as the casting element. Regardless of the configuration employed, the cooled casting surface should be at least as wide as the strip to be cast.

In a preferred embodiment, the casting element (22) comprises a water cooled, precipitation hardened copper alloy wheel containing about 98% copper. Copper and copper alloys are chosen for their high thermal conductivity and wear resistance and availability; however, steel, aluminum, aluminum alloys or other metals may be utilized. Multipiece wheels in which the casting surface is a sleeve made of one or other of the above metals may also be employed. Metallic or non-metallic coatings may be applied to the casting surface for improved release of the cast alloy from the surface, or for other reasons. Water is generally chosen as the cooling medium for its low cost, high heat capacity and its ready availability; however, other liquid or gaseous cooling media may be used.

In the operation of the strip casting apparatus, the surface (24) of the casting wheel (22) must be able to absorb the heat generated by contact with molten metal at the initial casting point (26), and such heat must diffuse substantially through the copper wheel to the cooling medium during each rotation of the wheel. Heat removal may be accomplished by delivering a sufficient quantity of water through internal passageways located near the periphery of the casting wheel (22). Alternatively, the cooling medium may be delivered to the underside of the casting surface. Understandably, refrigeration techniques and the like may be employed to accelerate or decelerate cooling rates, and/or to effectuate wheel expansion or contraction during strip casting.

Whether a drum, wheel or belt is employed for casting, the casting surface should be generally smooth and symmetrical to maximize uniformly in strip casting.

The molten material (30) to be cast in the apparatus described herein is preferably retained in a crucible (32), or tundish, which is provided with a pouring orifice (34) or nozzle. The nozzle is typically, though not necessarily, located at a lower portion of the tundish (32) as shown in FIG. 4.

Obviously, numerous modifications and variations of the present invention are possible in the light of the above teachings. It is therefore to be understood that within the scope of the appended claims, the invention may be practiced otherwise than as specifically described herein.

We claim:

1. An aluminum-lead bearing alloy with a lead content ranging from about 4.0% by weight to about 15% by weight in which the lead phase consists of uniformly distributed spherical particles less than 10 microns in diameter and predominantly 1 to 5 microns in diameter, and wherein the content of any other constituents totals not more than 10% by weight.

2. The alloy of claim 1 in the form of an as-cast strip 1-5 mm in thickness.

3. The alloy of claim 1 wherein said lead content is in excess of 10% by weight.

* * * * *